(12) United States Patent
Hung et al.

(10) Patent No.: US 6,926,559 B1
(45) Date of Patent: Aug. 9, 2005

(54) ELECTRICAL CONNECTOR ADAPTED FOR USE WITH DIFFERENT ELECTRONIC CARDS

(75) Inventors: Kun-Ming Hung, Tao-Yuan (TW); Darren Yu, Tao-Yuan (TW); Jacky Lin, Pa-Te (TW)

(73) Assignees: Proconn Technology Co., Ltd., (TW); DataFab System, Inc., Taipei (TW)

( * ) Notice: Subject to any disclaimer, the term of this patent is extended or adjusted under 35 U.S.C. 154(b) by 6 days.

(21) Appl. No.: 10/761,819

(22) Filed: Jan. 21, 2004

(51) Int. Cl.[7] .......................................... H01R 24/00
(52) U.S. Cl. ..................................... 439/630; 439/607
(58) Field of Search ................................ 439/630, 607

(56) References Cited

U.S. PATENT DOCUMENTS

| | | | |
|---|---|---|---|
| 6,386,920 B1 * | 5/2002 | Sun ............................ | 439/630 |
| 6,540,523 B1 * | 4/2003 | Kung et al. .................. | 439/64 |
| 6,666,724 B1 * | 12/2003 | Lwee .......................... | 439/630 |
| 6,672,904 B1 * | 1/2004 | Chen .......................... | 439/631 |
| 6,699,053 B2 * | 3/2004 | Kuroda ........................ | 439/218 |
| 6,738,259 B2 * | 5/2004 | Le et al. ...................... | 361/737 |
| 6,773,308 B2 * | 8/2004 | Lwee .......................... | 439/630 |

* cited by examiner

*Primary Examiner*—Ross Gushi
*Assistant Examiner*—X. Chung-Trans
(74) *Attorney, Agent, or Firm*—Law Office of Kenneth C. Brooks

(57) ABSTRACT

An electrical connector includes a dielectric connector housing confining a card receiving groove and having a front open side. The card receiving space is configured with first to fifth card receiving spaces, each of which is adapted to receive a corresponding one of first to fifth electronic cards, which have different specifications, therein. Conductive terminals are mounted on the connector housing, extend into the card receiving groove, and contact electrically conductive contacts on one of the first to fifth electronic cards when the latter is inserted into the corresponding one of the first to fifth card receiving spaces through the front open side of the connector housing.

10 Claims, 9 Drawing Sheets

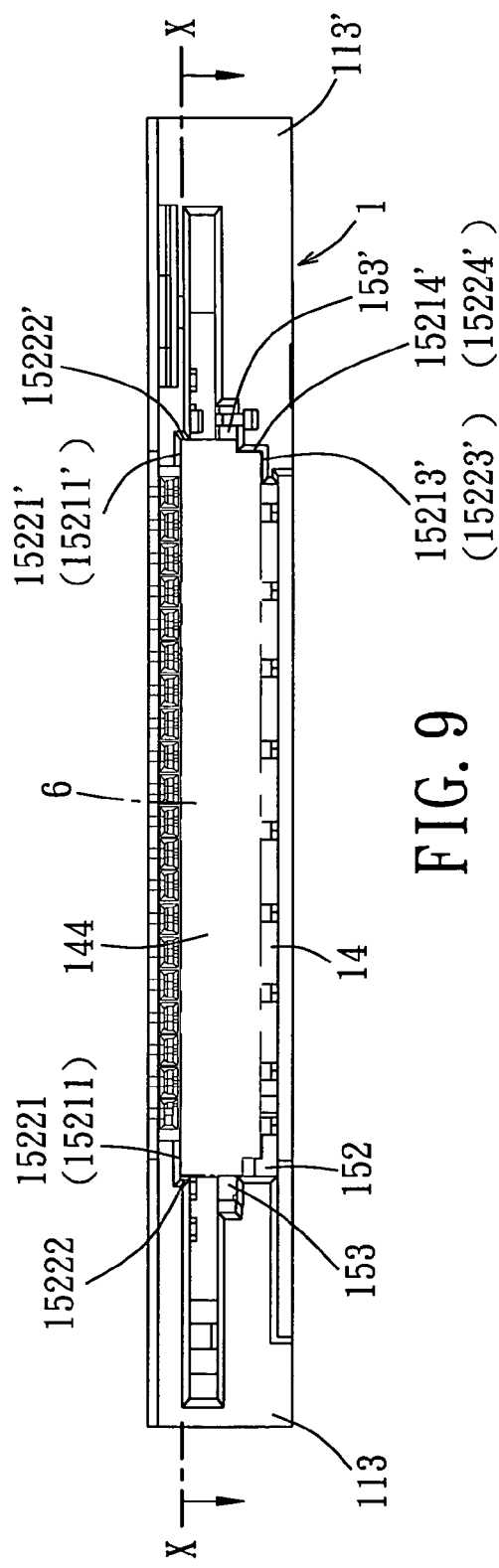
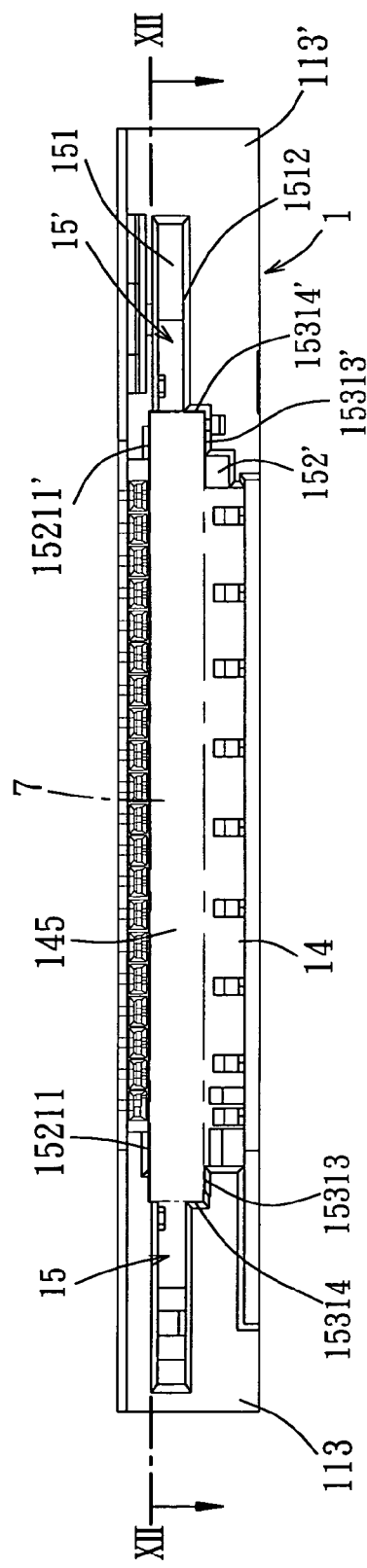

ELECTRICAL CONNECTOR ADAPTED FOR USE WITH DIFFERENT ELECTRONIC CARDS

BACKGROUND OF THE INVENTION

1. Field of the Invention

The invention relates to a connector, more particularly to an electrical connector adapted for use with different electronic cards.

2. Description of the Related Art

Various types of electronic cards, such as a memory stick (MS) card, a secure digital (SD) card, a multimedia card (MMC), a smart media card (SMC) and an XD card, are currently available for storing electrical data of portable electronic devices, such as a personal digital assistant (PDA), a digital camera (DC), a digital video camera (DV), an MP3 player, etc.

Since the above MS, SMC, MMC, SD and XD cards have different sizes and specifications, in view of limited available space, current portable electronic devices are not configured for use with a large number of the different electronic cards due to the lack of an electrical connector having different card receiving grooves for the above electronic cards.

SUMMARY OF THE INVENTION

Therefore, the object of the present invention is to provide an electrical connector that is adapted for use with first to fifth electronic cards having different specifications.

According to the present invention, there is provided an electrical connector adapted for use with first to fifth electronic cards. The first to fifth electronic cards are formed with a respective set of conductive contacts and have different specifications. The electrical connector comprises:

a dielectric connector housing confining a card receiving groove and having a front open side, the card receiving space being configured with first to fifth card receiving spaces, each of which is adapted to receive a corresponding one of the first to fifth electronic cards therein; and conductive terminal means mounted on the dielectric connector housing, extending into the card receiving groove, and adapted to contact electrically the conductive contacts on one of the first to fifth electronic cards when said one of the first to fifth electronic cards is inserted into the corresponding one of the first to fifth card receiving spaces through the front open side of the dielectric connector housing.

BRIEF DESCRIPTION OF THE DRAWINGS

Other features and advantages of the present invention will become apparent in the following detailed description of the preferred embodiment with reference to the accompanying drawings, of which:

FIG. 9 is a schematic front view showing the preferred embodiment when used with a fourth electronic card;

FIG. 11 is a schematic front view showing the preferred embodiment when use with a fifth electronic card.

DETAILED DESCRIPTION OF THE PREFERRED EMBODIMENT

Figure 1:
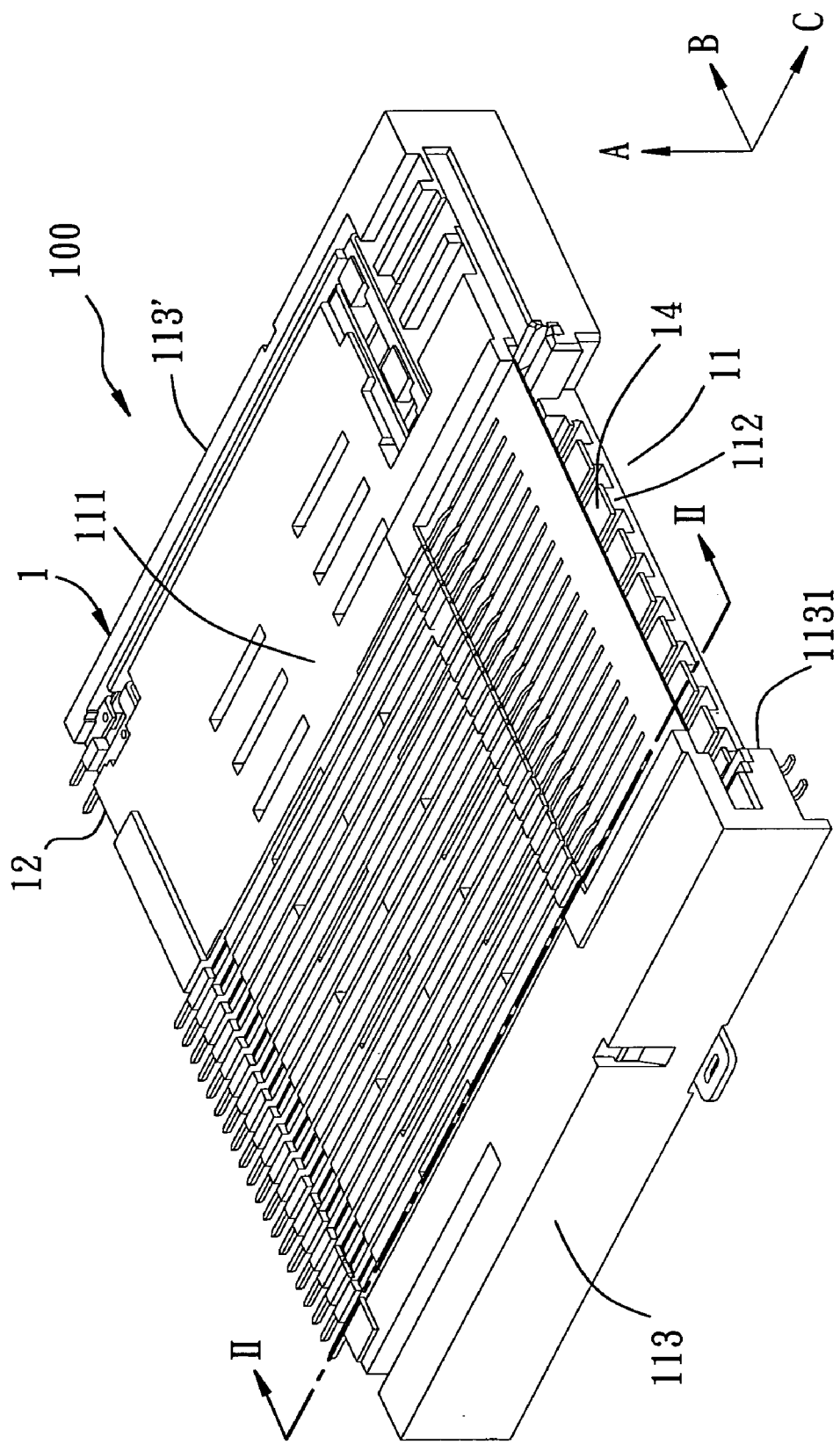
FIG. 1 is a perspective view showing the preferred embodiment of an electrical connector according to this invention.
Figure 2:
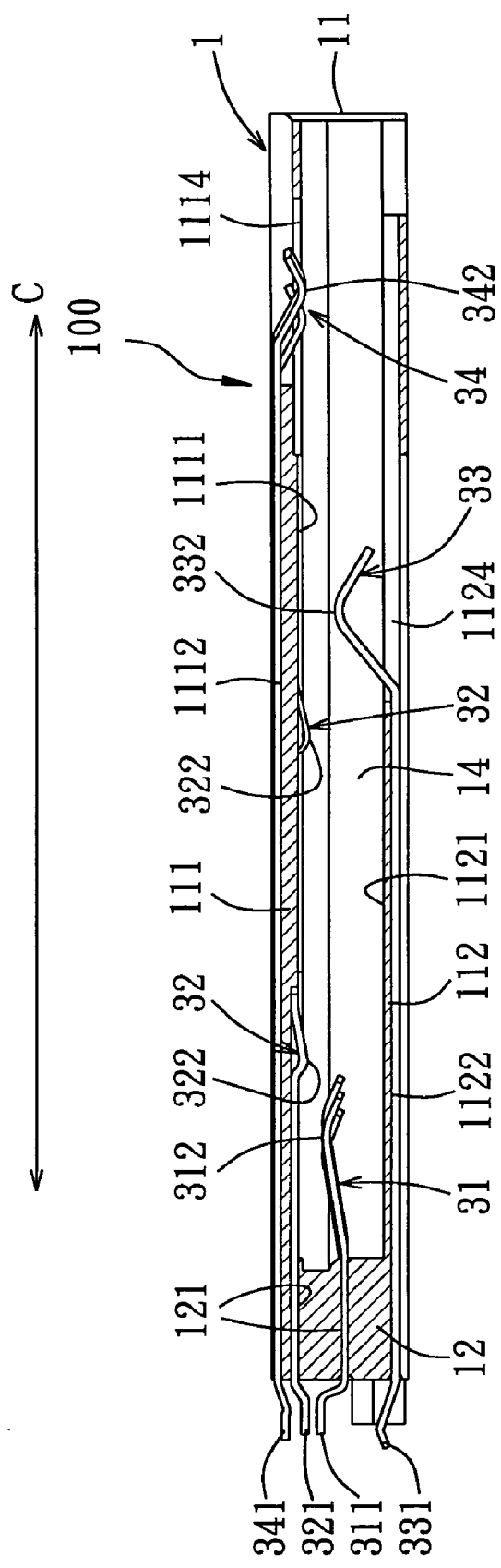
FIG. 2 is a schematic sectional view of FIG. 1, taken along line II—II.
Figure 3:
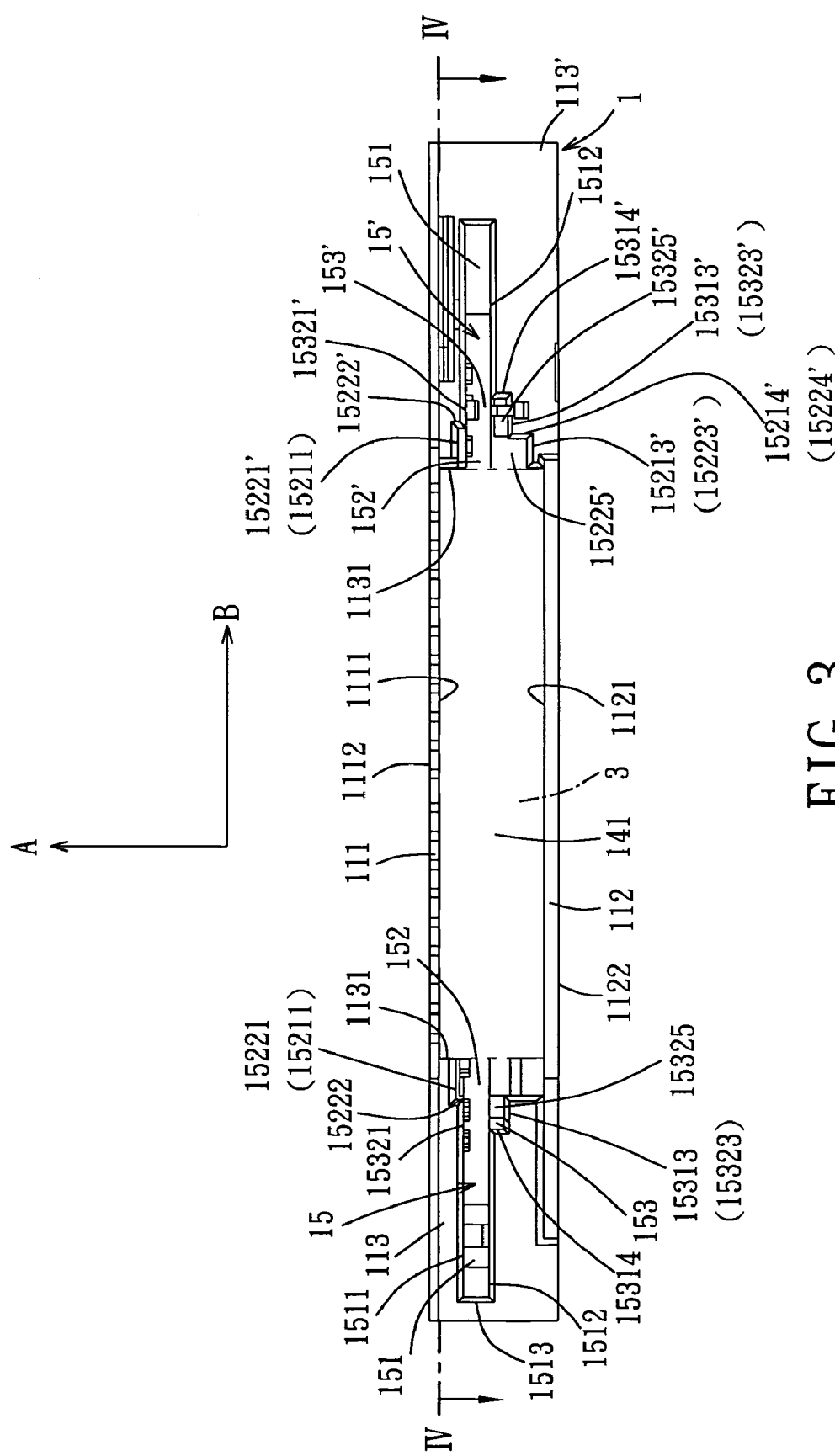
FIG. 3 is a schematic front view showing the preferred embodiment when used with a first electronic card.

Referring to FIGS. 1 to 3, the preferred embodiment of an electrical connector 100 according to the present invention is shown to be adapted for use with first to fifth electronic cards. As illustrated in FIGS. 3 to 12, the first to fifth electronic cards are MS, SMC, MMC, SD and XD cards 3, 4, 5, 6, 7, respectively, which are formed with a respective set of conductive contacts (not shown) and which have different specifications. The electrical connector 100 includes a dielectric connector housing 1 and conductive terminal means.

The dielectric connector housing 1 has top and bottom walls 111, 112 opposite to each other in a first direction (A), a rear wall 12 interconnecting the top and bottom walls 111, 112, and left and right lateral walls 113, 113' opposite to each other in a second direction (B), interconnecting the top and bottom walls 111, 112 and cooperating with the rear wall 12 and the top and bottom walls 111, 112 so as to confine a card accommodating groove 14, as best shown in FIG. 1. The dielectric connector housing 1 further has a front open side 11 opposite to the rear wall 12 in a third direction (C) for access into the card accommodating groove 14, as best shown in FIG. 2.

As best shown in FIGS. 2 and 3, the top wall 111 has a first inner mounting surface 1111, and a first outer mounting surface 1112. The bottom wall 112 has a second inner mounting surface 1121, and a second outer mounting surface 1122 opposite to the second inner mounting surface 1121. Each of the left and right lateral walls 113, 113' has an inner surface 1131 (see FIG. 3).

Figure 4:
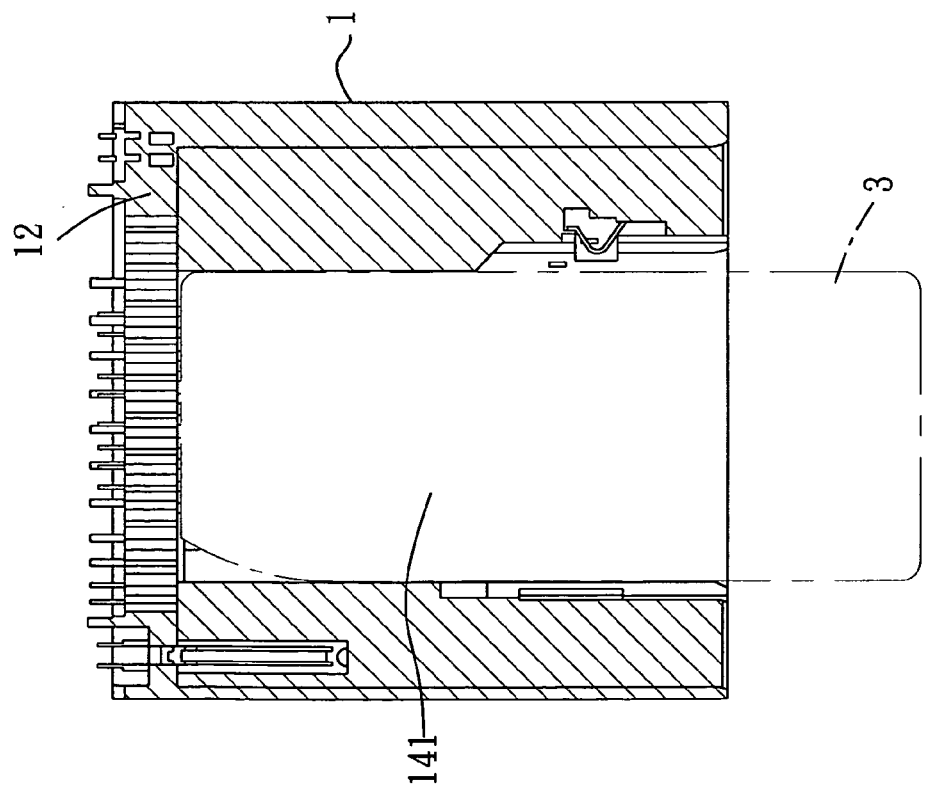
FIG. 4 is a schematic sectional view of FIG. 3, taken along line IV—IV.

The first and second inner mounting surfaces 1111, 1121 of the top and bottom walls 111, 112, the inner surfaces 1131 of the left and right walls 113, 113' and the rear wall 12 configure the card accommodating groove 14 with a first card receiving space 141 adapted to receive the MS card (i.e., the first electronic card) 3 therein, as shown in FIGS. 3 and 4.

Figure 6:
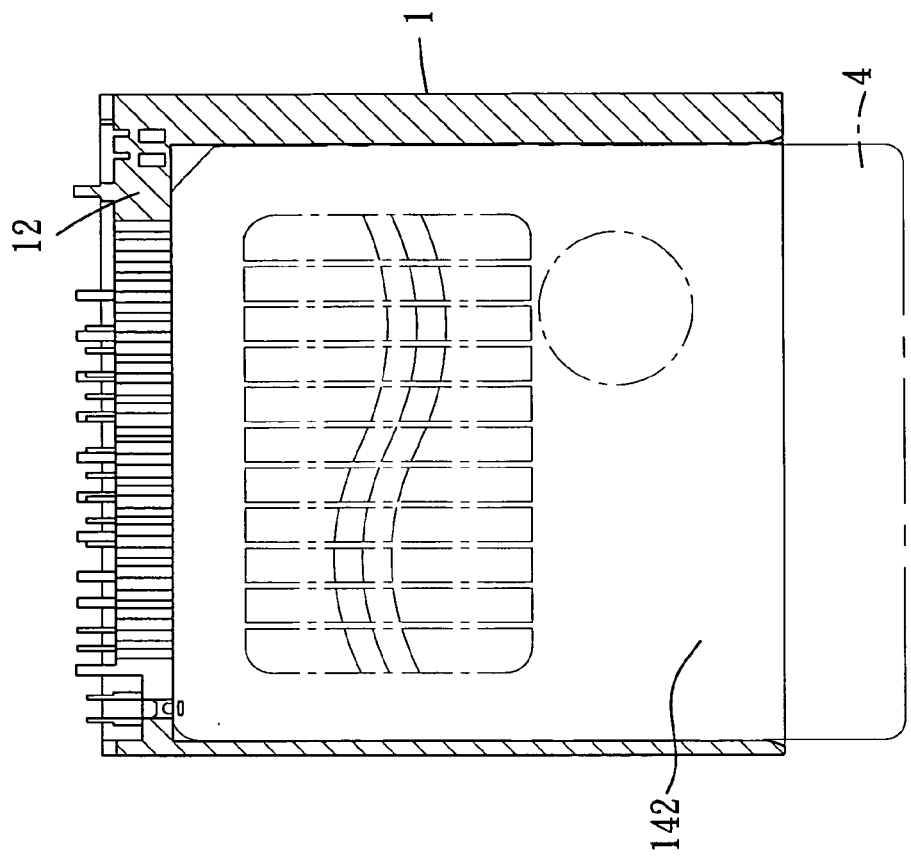
FIG. 6 is a schematic sectional view of FIG. 5, taken along line VI—VI.
Figure 5:
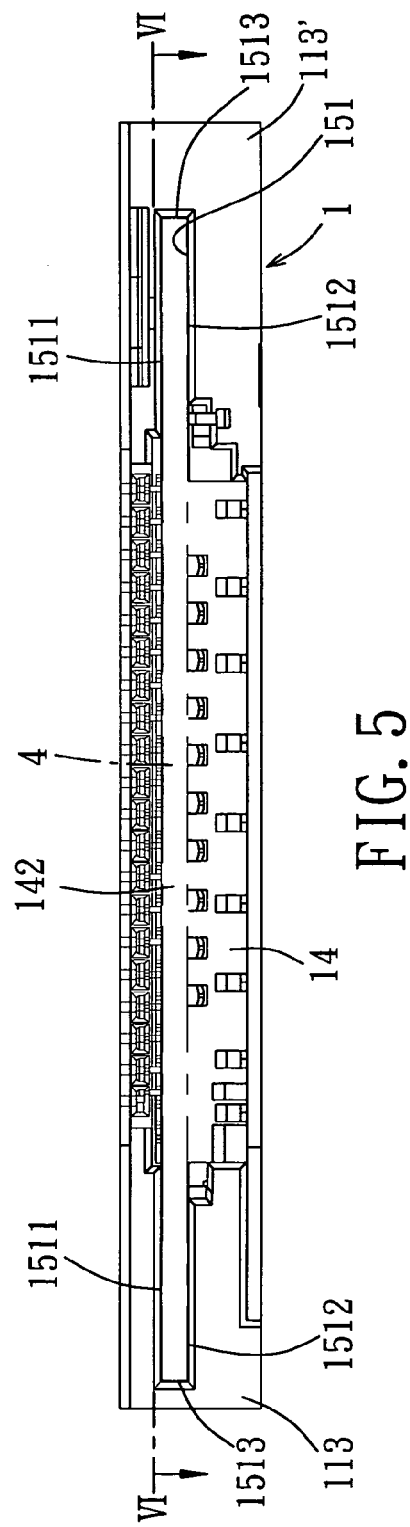
FIG. 5 is a schematic front view showing the preferred embodiment when used with a second electronic card.

Referring to FIGS. 3, 5 and 6, the inner surface 1131 of each of the left and right lateral walls 113, 113' is formed with an elongate engaging groove 15, 15' that has a narrowest first portion 151, a widest second portion 152, 152' opposite to the first portion 151 in the second direction (B), in spatial communication with the card accommodating groove 14, and having a width in the first direction (A) less than a distance between the first and second inner mounting surfaces 1111, 1121 of the top and bottom walls 111, 112, and a third portion 153, 153' interconnecting the first portion 151 and the second portion 152, 152', as best shown in FIG. 3.

The first portion 151 of the engaging groove 15, 15' in the inner surface 1131 of each of the left and right lateral walls 113, 113' has first top, bottom and lateral limit walls 1511, 1512, 1513. The first top, bottom and lateral limit walls 1511, 1512, 1513 of the engaging grooves 15, 15' in the left and right lateral walls 113, 113' and the rear wall 12 configure the card accommodating groove 14 with a second card receiving space 142 adapted to receive the SMC card (i.e., the second electronic card) 4 therein, as shown in FIGS. 5 and 6.

Figure 8:
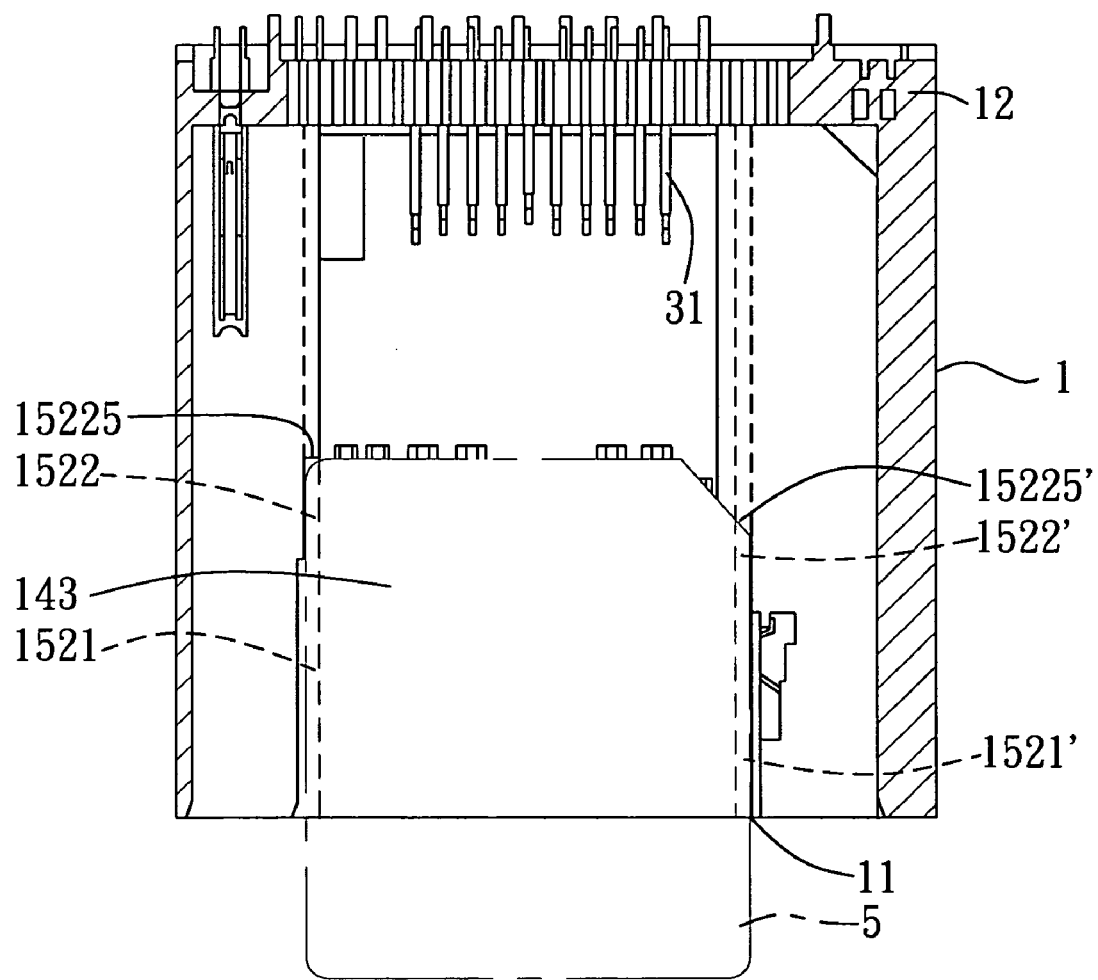
FIG. 8 is a schematic sectional view of FIG. 7, taken along line VIII—VIII.

The second portion 152, 152' of the engaging groove 15, 15' in each of the left and right lateral walls 113, 113' has a front part 1521, 1521' proximate to the front open side 11 of the dielectric connecting housing 1, and a rear part 1522, 1522' between the front part 1521, 1521' and the rear wall 12 (see FIG. 8).

Figure 7:
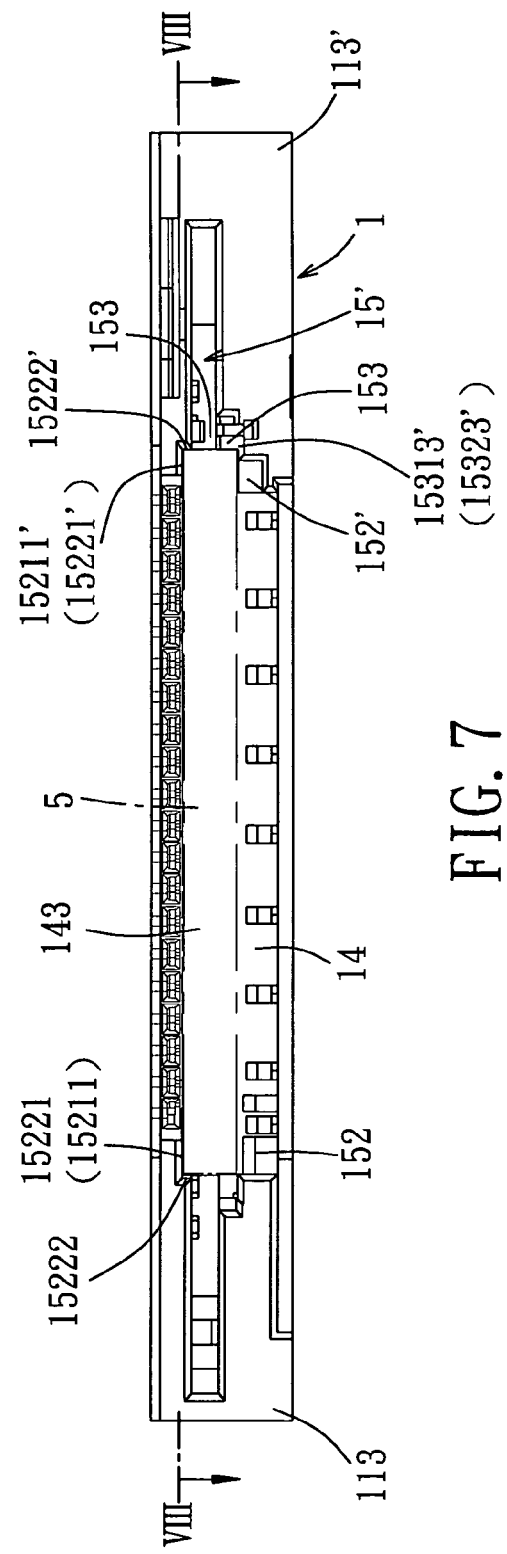
FIG. 7 is a schematic front view showing the preferred embodiment when used with a third electronic card.

In this embodiment, the front part 1521 of the second portion 152 of the engaging groove 15 in the left lateral wall 113 has a first front top limit wall 15211, as shown in FIG. 3. The rear part 1522 of the second portion 152 of the engaging groove 15 in the left lateral wall 113 has a first rear top limit wall 15221 connected to the first front top limit wall 15211, a first rear top shoulder wall 15222 connected to the first rear top limit wall 15221, and a first rear limit wall 15225 connected to the first rear top limit wall 15221 and the first rear top shoulder wall 15222, as shown in FIGS. 7 and 8. The front part 1521' of the second portion 152' of the engaging groove 15' in the right lateral wall 113' has a second front top limit wall 15211', a second front bottom limit wall 15213' opposite to the second front top limit wall 15211' in the first direction (A), and a second front bottom shoulder wall 15214' connected to the second front bottom limit wall 15213', as shown in FIG. 3. The rear part 1522' of the second portion 152' of the engaging groove 15' on the right lateral wall 113' has a second rear top limit wall 15221' connected to the second front top limit wall 15211', a second rear top shoulder wall 15222' connected to the second rear top limit wall 15221', a second rear bottom limit wall 15223' connected to the second front bottom limit wall 15213', a second rear bottom shoulder wall 15224' connected to the second rear bottom wall 15223', and a second rear limit wall 15225' connected to the second rear top and bottom limit walls 15221', 15223' and the second rear top and bottom shoulder walls 15222', 15224', as shown in FIGS. 7 and 8.

Figure 12:
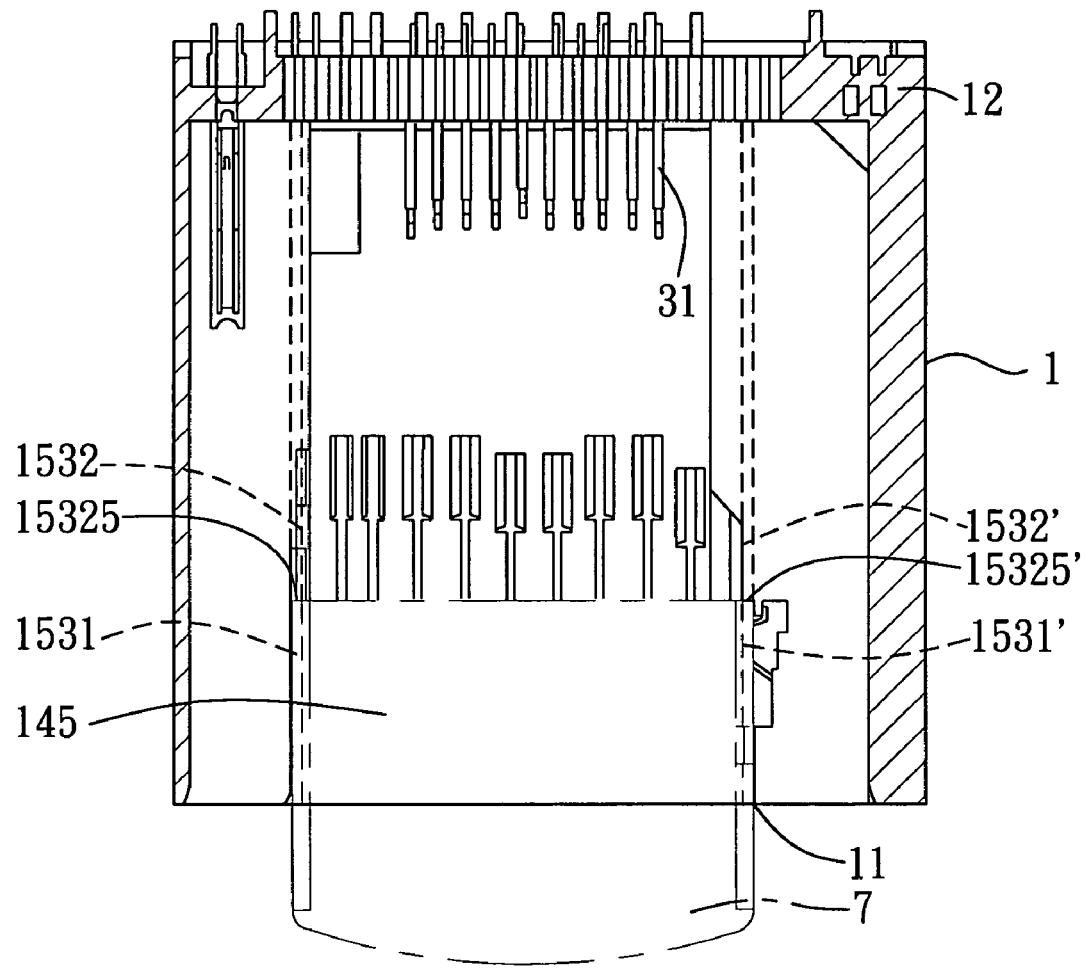
FIG. 12 is a schematic sectional view of FIG. 11, taken along line XII—XII.

The third portion 153 of the engaging groove 15 in each of the left and right lateral walls 113, 113' has a front part 1531, 1531' proximate to the front open side 11 of the dielectric connector housing 1, and a rear part 1532, 1532' between the front part 1531, 1531' and the rear wall 12 (see FIG. 12).

In this embodiment, the front part 1531 of the third portion 153 of the engaging groove 15 in the left lateral wall 113 has a third front bottom limit wall 15313, and a third front bottom shoulder wall 15314 interconnecting the third front bottom limit wall 15313 and the first bottom limit wall 1512 of the first portion 151 of the engaging groove 15 in the left lateral wall 113, as shown in FIG. 11. The rear part 1532 of the third portion 153 of the engaging groove 15 in the left lateral wall 113 has a third rear top limit wall 15321 connected to the first rear top shoulder wall 15222 of the second portion 152 of the engaging groove 15 in the left lateral wall 113, a third rear bottom limit wall 15323 connected to the third front bottom limit wall 15313, and a third rear limit wall 15325 connected to the third rear top and bottom limit walls 15321, 15323, as shown in FIGS. 3 and 12. The front part 1531' of the third portion 153' of the engaging groove 15' in the right lateral wall 113' has a fourth bottom limit wall 15313', and a fourth front bottom shoulder wall 15314' interconnecting the fourth front bottom limit wall 15313' and the first bottom limit wall 1512 of the first portion 151 of the engaging groove 15' in the right lateral wall 113', as shown in FIG. 11. The rear part 1532' of the third portion 153' of the engaging groove 15' in the right lateral wall 113' has a fourth rear top limit wall 15321' connected to the second rear top shoulder wall 15222' of the second portion 152' of the engaging groove 15' in the right lateral wall 113', a fourth rear bottom limit wall 15323' connected to the fourth front bottom limit wall 15313', and a fourth rear limit wall 15325' connected to the fourth rear top and bottom limit walls 15321', 15323', as shown in FIGS. 3 and 12.

As such, the first front and rear top limit walls 15211, 15221, the first rear top shoulder wall 15222, the first rear limit wall 15225, the second front and rear top limit walls 15211', 15221', the second rear top shoulder wall 15222', the fourth front and rear bottom limit walls 153131', 15323' and the second rear limit wall 15225' configure the card accommodating groove 14 with a third card receiving space 143 adapted to receive the MMC card (i.e., the third electronic card) 5 therein, as shown in FIGS. 7 and 8.

Figure 10:
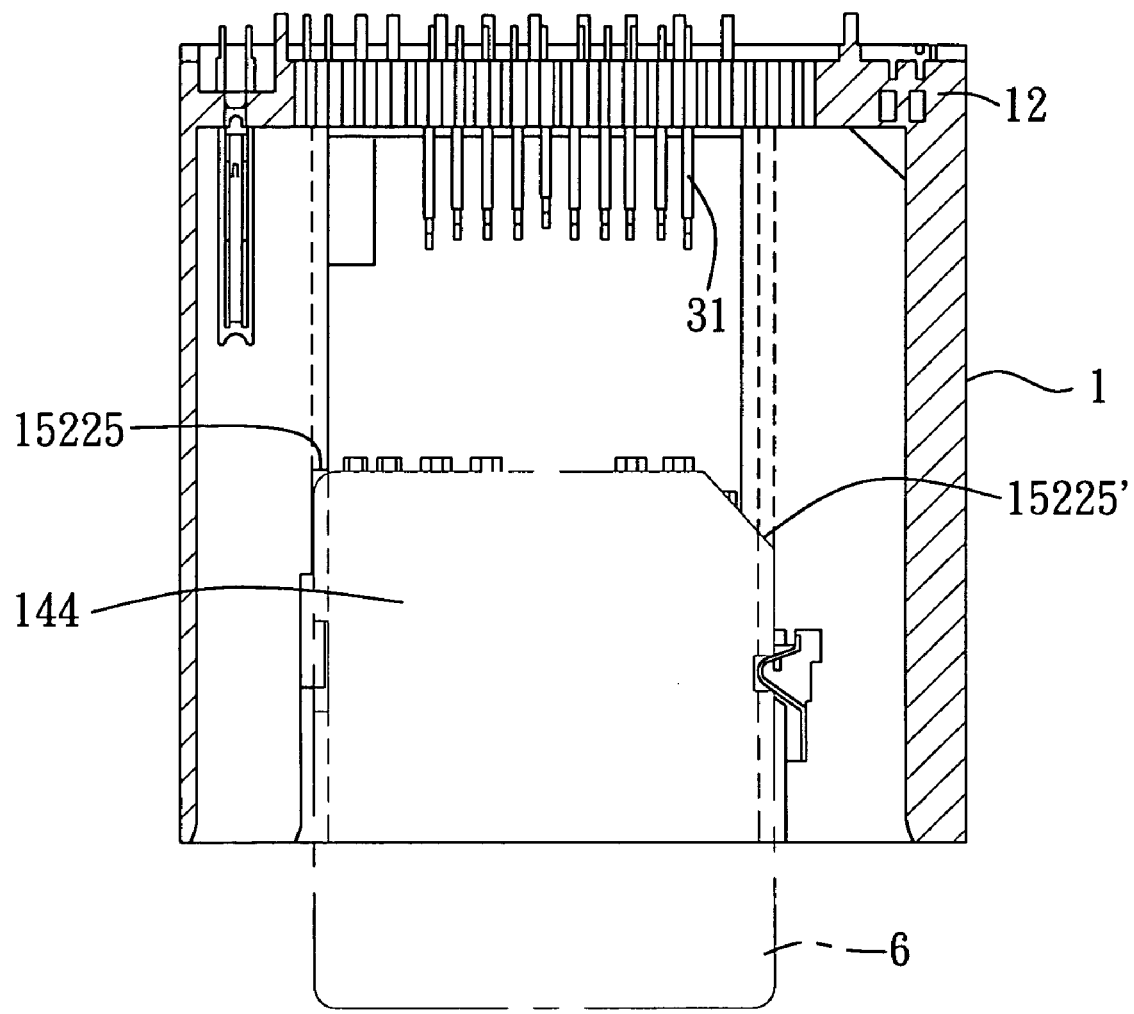
FIG. 10 is a schematic sectional view of FIG. 9, taken along line X—X.

Moreover, the first front and rear top limit walls 15211, 15221, the first rear top shoulder wall 15222, the first rear limit wall 15225, the second front and rear top limit walls 15211', 15221', the second rear top shoulder wall 15222', the second front and rear bottom limit walls 152131', 15223', the second front and rear bottom shoulder walls 15214', 15224' and the second rear limit wall 15225' configure the card accommodating groove 14 with a fourth card receiving space 144 adapted to receive the SD card (i.e., the fourth electronic card) 6 therein, as shown in FIGS. 9 and 10.

The first and second front top limit walls 15211, 15211', the third and fourth bottom limit walls 15313, 153131', the third and fourth front bottom shoulder walls 15314, 15314', and the third and fourth rear limit walls 15325, 15325' configure the card accommodating groove 14 with a fifth card receiving space 145 adapted to receive the XD card (i.e., the fifth electronic card) 7 therein, as shown in FIGS. 11 and 12.

The conductive terminal means is mounted on the dielectric connector housing 1, extends into the card accommodating groove 14, and is adapted to contact electrically the conductive contacts on one of the first to fifth electronic cards 3, 4, 5, 6, 7 when the latter is inserted into a corresponding one of the first to fifth card receiving spaces 141~145 through the front open side 11 of the dielectric connector housing 1. In this embodiment, the conductive terminal means includes a set of first conductive terminals 31, a set of second conductive terminals 32, a set of third conductive terminals 33, and a set of fourth conductive terminals 34, as shown in FIG. 2.

The first conductive terminals 31 are mounted on the rear wall 12. Each first conductive terminal 31 has a first coupling end portion 311 extending outwardly of the rear wall 12 through a corresponding one of a plurality of mounting holes 121 in the rear wall 12, and a first contacting end portion 312 opposite to the first coupling end portion 311, projecting into the first card receiving space 141, and adapted to contact electrically a corresponding one of the conductive contacts on the MS card 3 when the MS card 3 is inserted into the first card receiving space 141 through the front open side 11 of the dielectric connector housing 1.

The second conductive terminals 32 are mounted on the first inner mounting surface 1111 of the top wall 111. Each second conductive terminal 32 has a second coupling end portion 321 extending outwardly of the rear wall 12 through a corresponding one of the mounting holes 121 in the rear wall 12, and a second contacting end portion 322 opposite to the second coupling end portion 321, projecting into the second card receiving space 142, and adapted to contact electrically a corresponding one of the conductive contacts on the SMC card 4 when the SMC card 4 is inserted into the second card receiving space 142 through the front open side 11 of the dielectric connector housing 1.

The third conductive terminals 33 are mounted on the second outer mounting surface 1122 of the bottom wall 112. Each third conductive terminal 33 has a third coupling end portion 331 extending outwardly of the rear wall 12, and a third contacting end portion 332 opposite to the third coupling end portion 331, projecting into the third and fourth card receiving spaces 143, 144, and adapted to contact electrically a corresponding one of the conductive contacts on one of the MMC and SD cards 5, 6 when said one of the MMC and SD cards 5, 6 is inserted into the corresponding one of the third and fourth card receiving spaces 143, 144 through the front open side 11 of the dielectric connector housing 1. In this embodiment, the bottom wall 112 of the dielectric connector housing 1 is formed with a through hole unit 1124 which permits extension of the third contacting end portions 332 of the third conductive terminals 33 into the third and fourth card receiving spaces 143, 144.

The fourth conductive terminals 34 are mounted on the first outer mounting surface 1112 of the top wall 111. Each fourth conductive terminal 34 has a fourth coupling end portion 341 extending outwardly of the rear wall 12, and a fourth contacting end portion 342 opposite to the fourth coupling end portion 341, projecting into the fifth card receiving space 145, and adapted to contact electrically a corresponding one of the conductive contacts on the XD card 7 when the XD 7 card is inserted into the fifth card receiving space 145 through the front open side 11 of the dielectric connector housing 1. In this embodiment, the top wall 111 of the dielectric connector housing 1 has a front end portion 1113 formed with a through hole unit 1114 which permits extension of the fourth contacting end portions 342 of the fourth conductive terminals 34 into the fifth card receiving space 145 therethrough.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electrical connector adapted for use with first to fifth electronic cards, the first to fifth electronic cards being formed with a respective set of conductive contacts and having different specifications, said electrical connector comprising:

a dielectric connector housing having top and bottom walls opposite to each other in a first direction, a rear wall interconnecting said top and bottom walls, and lateral walls opposite to each other in a second direction, interconnecting said top and bottom walls and cooperating with said rear wall and said top and bottom wall s so as to confine a card accommodating groove, said dielectric connector housing further having a front open side opposite to said rear wall in a third direction for access into said card accommodating groove, said top wall having a first inner mounting surface and a first outer mounting surface opposite to said first inner mounting surface, said bottom wall having a second inner mounting surface and a second outer mounting surface opposite to said second inner mounting surface, each of said lateral walls having an inner surface, said first and second inner mounting surfaces of said top and bottom walls, said inner surfaces of said lateral walls and said rear wall configuring said card accommodating groove with a first card receiving space adapted to receive the first electronic card therein, said inner surface of each of said lateral walls being formed with an elongate engaging groove that has a narrowest first portion, a widest second portion opposite to said first portion in the second direction, in spatial communication with said card accommodating groove, and having a width in the first direction less than a distance between said first and second inner mounting surfaces of said top and bottom walls, and a third portion interconnecting said first and second portions, said first portion of said engaging groove in said inner surface of each of said lateral walls having first top, bottom and lateral limit walls, said first top, bottom and lateral limit walls of said first portions of said engaging grooves in said lateral walls and said rear wall configuring said card accommodating groove with a second card receiving space adapted to receive the second electronic card therein, said second portion of said engaging groove in each of said lateral walls having a front part proximate to said front open side of said dielectric connector housing, and a rear part between said front part and said rear wall, said front part of said second portion of said engaging groove in one of said lateral walls having a first front top limit wall, said rear part of said second portion of said engaging groove in said one of said lateral walls having a first rear top limit wall connected to said first front top limit wall, a first rear top shoulder wall connected to said first rear top limit wall, and a first rear limit wall connected to said first rear top limit wall and said first rear top shoulder wall, said front part of said second portion of said engaging groove in the other one of said lateral walls having a second front top limit wall, a second front bottom limit wall opposite to said second front top limit wall in the first direction, and a second front bottom shoulder wall connected to said second front bottom limit wall, said rear part of said second portion of said engaging groove in the other one of said lateral walls having a second rear top limit wall connected to said second front top limit wall, a second rear top shoulder wall connected to said second rear top limit wall, a second rear bottom limit wall connected to said second front bottom limit wall, a second rear bottom shoulder wall connected to said second rear bottom limit wall, and a second rear limit wall connected to said second rear top and bottom limit walls and said second rear top and bottom shoulder walls, said third portion of said engaging groove in each of said lateral walls having a front part proximate to said front open side of said dielectric connector housing, and a rear part between said front part and said rear wall, said front part of said third portion of said engaging groove in said one of said lateral walls having a third front bottom limit wall and a third front bottom shoulder wall interconnecting said third front bottom limit wall and said first bottom limit wall of said first portion of said engaging groove in said one of said lateral walls, said rear part of said third portion of said engaging groove in said one of said lateral walls having a third rear top limit wall connected to said first rear top shoulder wall of said second portion of said engaging groove in said one of said lateral walls, a third rear bottom limit wall connected to said third front bottom limit wall, and a third rear limit wall connected to said third rear top and bottom limit walls, said front part of said third portion of said engaging groove in the other one of said lateral walls having a fourth front bottom limit wall and a fourth front bottom shoulder wall interconnecting said fourth front bottom limit wall and said first bottom limit wall of said first portion of said engaging groove in the other one of said lateral walls, said rear part of said third portion of said engaging groove in the other one of said lateral walls having a fourth rear top limit wall connected to said second rear top shoulder wall of said second portion of said engaging groove in the other one of said lateral walls, a fourth rear bottom limit wall connected to said fourth front bottom limit wall, and a fourth rear limit wall connected to said fourth rear top and bottom limit walls, said first front and rear top limit walls, said first rear top shoulder wall, said first rear limit wall, said second front and rear top limit walls, said second rear top shoulder wall, said fourth front and rear bottom limit walls and said second rear limit wall configuring said card accommodating groove with a third card receiving space adapted to receive the third electronic card therein, said first front and rear top limit walls, said first rear top shoulder wall, said first rear limit wall, said second front and rear top limit walls, said second rear top shoulder wall, said second front and rear bottom limit walls, said second front and rear bottom shoulder walls and said second rear limit wall configuring said card accommodating groove with a fourth card receiving space adapted to receive the fourth electronic card therein, said first and second front top limit walls, said third and fourth front bottom limit walls, said third and fourth front bottom shoulder walls and said third and fourth rear limit walls configuring said card accommodating groove with a fifth card receiving space adapted to receive the fifth electronic card therein; and conductive terminal means mounted on said dielectric connector housing, extending into said card accommodating groove, and adapted to contact electrically the conductive contacts on one of the first to fifth electronic cards when said one of the first to fifth electronic cards is inserted into a corresponding one of said first to fifth card receiving spaces through said front open side of said dielectric connector housing.

2. The electrical connector as claimed in claim 1, wherein said conductive terminal means includes:

a set of first conductive terminals mounted on said rear wall, each of said first conductive terminals having a first coupling end portion extending outwardly of said rear wall and a first contacting end portion opposite to said first coupling end portion, projecting into said first card receiving space, and adapted to contact electrically a corresponding one of the conductive contacts on the first electronic card when the first electronic card is inserted into said first card receiving space through said front open side of said dielectric connector housing; a set of second conductive terminals mounted on said first inner mounting surface of said top wall, each of said second conductive terminals having a second coupling end portion extending outwardly of said rear wall and a second contacting end portion opposite to said second coupling end portion, projecting into said second card receiving space, and adapted to contact electrically a corresponding one of the conductive contacts on the second electronic card when the second electronic card is inserted into said second card receiving space through said front open side of said dielectric connector housing;

a set of third conductive terminals mounted on said second outer mounting surface of said bottom wall, each of said third conductive terminals having a third coupling end portion extending outwardly of said rear wall and a third contacting end portion opposite to said third coupling end portion, projecting into said third and fourth card receiving spaces I and adapted to contact electrically a corresponding one of the conductive contacts on one of the third and fourth electronic cards when said one of the third and fourth electronic cards is inserted into the corresponding one of said third and fourth card receiving spaces through said front open side of said dielectric connector housing; and a set of fourth conductive terminals mounted on said first outer mounting surface of said top wall, each of said fourth conductive terminals a fourth having coupling end portion extending outwardly of said rear wall and a fourth contacting end portion opposite to said fourth coupling end portion, projecting into said fifth card receiving space, and adapted to contact electrically a corresponding one of the conductive contacts on the fifth electronic card when the fifth electronic card is inserted into said fifth card receiving space through said front open side of said dielectric connector housing.

3. The electrical connector as claimed in claim 2, wherein said top wall of said dielectric connector housing is formed with a through hole unit which permits extension of said fourth contacting end portions of said fourth conductive terminals into said fifth card receiving space therethrough.

4. The electrical connector as claimed in claim 2, wherein said bottom wall of said dielectric connector housing is formed with a through hole unit which permits extension of said third contacting end portions of said third conductive terminals into said third and fourth card receiving spaces therethrough.

5. The electrical connector as claimed in claim 2, wherein said rear wall is formed with a plurality of mounting holes that respectively permit extension of said first coupling end port ions of said first conductive terminals and said second coupling end portions of said second conductive terminals therethrough.

6. The electrical connector as claimed in claim 1, wherein said first card receiving space is adapted to accommodate a memory stick card.

7. The electrical connector as claimed in claim 1, wherein said second card receiving space is adapted to accommodate a smart media card.

8. The electrical connector as claimed in claim 1, wherein said third card receiving space is adapted to accommodate a multimedia card.

9. The electrical connector as claimed in claim 1, wherein said fourth card receiving space is adapted to accommodate a secure digital card.

10. The electrical connector as claimed in claim 1, wherein said fifth card receiving space is adapted to accommodate an XD card.

* * * * *